(12) United States Patent
Matsuda et al.

(10) Patent No.: US 7,124,126 B1
(45) Date of Patent: Oct. 17, 2006

(54) INFORMATION RETRIEVAL APPARATUS AND RECORDING MEDIUM HAVING AN INFORMATION RETRIEVAL PROGRAM RECORDED

(75) Inventors: Katsushi Matsuda, Tokyo (JP); Hajime Sugawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1193 days.

(21) Appl. No.: 09/614,721

(22) Filed: Jul. 12, 2000

(30) Foreign Application Priority Data

Jul. 13, 1999 (JP) ................................ 11-198820

(51) Int. Cl.
G06F 7/00 (2006.01)
G06F 17/00 (2006.01)
G06F 17/30 (2006.01)

(52) U.S. Cl. ............................ 707/3; 707/4; 707/104.1
(58) Field of Classification Search .................... 707/3, 707/104.1, 4
See application file for complete search history.

(56) References Cited

U.S. PATENT DOCUMENTS

| | | | |
|---|---|---|---|
| 5,628,008 A * | 5/1997 | Hayashi ...................... 715/513 |
| 5,848,407 A * | 12/1998 | Ishikawa et al. ............... 707/2 |
| 5,848,410 A * | 12/1998 | Walls et al. .................... 707/4 |
| 5,953,718 A * | 9/1999 | Wical ............................ 707/5 |
| 5,983,247 A * | 11/1999 | Yamanaka et al. ........... 715/526 |
| 6,035,338 A * | 3/2000 | Hirakawa et al. ............ 709/243 |
| 6,073,143 A * | 6/2000 | Nishikawa et al. ......... 715/513 |
| 6,424,980 B1 * | 7/2002 | Iizuka et al. ................. 715/513 |
| 6,460,034 B1 * | 10/2002 | Wical ............................ 707/5 |
| 6,546,406 B1 * | 4/2003 | DeRose et al. .............. 715/513 |
| 6,594,697 B1 * | 7/2003 | Praitis et al. ................ 709/225 |
| 6,742,163 B1 * | 5/2004 | Ono et al. ................... 715/513 |
| 6,763,496 B1 * | 7/2004 | Hennings et al. ........ 715/501.1 |

FOREIGN PATENT DOCUMENTS

| | | |
|---|---|---|
| JP | 7-105233 | 4/1995 |
| JP | 9-37229 | 2/1997 |
| JP | 269237 | 9/1998 |
| JP | 99-FI-53 | 1/1999 |
| JP | 11-85788 | 3/1999 |
| JP | 11-341491 | 12/1999 |
| JP | 2002-44223 | 2/2002 |
| JP | 205042 | 6/2002 |

OTHER PUBLICATIONS

Japan Office Action with English translation of pertinent portions.
"Type Classification and Retrieval Using an Internet Multilateral Retrieval System OTROS-Structural Features", Information Processing Society of Japan, 57th National Conventional Proceedings (3), pp. 145-146, 1998).
325115 Japanese Office Action with English translation of pertinent potions, dated Oct. 1, 2002.

* cited by examiner

Primary Examiner—Frantz Coby
Assistant Examiner—Cindy Nguyen
(74) Attorney, Agent, or Firm—Whitham, Curtis, Christofferson & Cook, PC

(57) ABSTRACT

The invention analyzes a character string and link information of a WWW page being currently browsed, infers that the said page is a page having a collection of information of a certain kind, namely, an objective field such as present information, event information or the like, and embeds into this page a function of performing a retrieval limited to the inferred objective field. A user performs a limited retrieval using the retrieval function and obtains other information of the said objective field.

7 Claims, 8 Drawing Sheets

The Great Devil of Presents

Home Page of Present Information by the Great Devil of Presents who is a friend of everyone

---

Get Thousand Dollar Worth of Gorgeous Goods

Buy a ... to go to a Round-The-World Trip
Win a new vihicle of ...

Many a little makes a mickle

What! Five Dollar Worth of Book Prepaid Cards for Five Hundred Persons
Beer Prepaid Card for Everyone who would buy 30 bottles of ... beer
On-Line Shopping of the .... Company
Get a ... by answering a questionnaire Get Thousand Dollar Worth of Gorgeous Goods ABC coffee is presenting 100th anniversary goods
Win ... for a hundred persons by registering with a free mail magazine
a questionnaire about internet service providers
Get ... Goods by answering a quiz Many a little makes a litter Dole available
Broken Vacuum Bottle available
Cursed VTR

FIG.2

```html
<html><head><title>The Great Devil of Presents</title></head>
<bodybgcolor="#FFFFF">
<p align="center"><img src="present_devil.gif" width="500" height="100">
</p>
<p align="center">Home Page of Present Information by the Great Devil of
Presents who is a friend of everyone</p>
<hr>
<div align="center"><center>
<table border="0" cellpadding="5"cellspacing="6"width="100%">
<tr>
 <td valign="top">Get Thousand Dollar Worth of Gorgeous Goods<blockquote
>
  <a href="http://a.b.c/a.htm">Buy a ... to go to a Round-The-World Trip
</a><br>
  <a href="http://d.e.f/d.htm">Win a new vihicle of ...</a>
  </blockquote></td>
 <td valign="top">Get Thousand Dollar Worth of Gorgeous Goods<blockquote
>
  <a href="http://g.h.i/g.htm">ABC coffee is presenting 100th
anniversary goods</a><br>
  <a href="http://j.k.l/j.htm">Win ..., for a hundred persons</a><br>
  <a href="http://m.n.o/m.htm">by registering with a free mail magagine<
/a><br>
  <a href="http://p.q.r/p.htm">a questionnaire about internet service
providers</a><br>
  <a href="http://s.t.u/s.htm">Get ... Goods by answering a quiz</a>
  </blockquote></td></tr>
<tr>
 <td valign="top">Many a little makes a mickle<blockquote>
  <a href="a.htm">What! Five Dollar Worth of Book Prepaid Cards for Five
Hundred Persons</a><br>
  <a href="a.htm">Beer Prepaid Card for Everyone who would buy 30
bottles of ... beer</a><br>
  <a href="a.htm">On-Line Shopping of the ... Company</a><br>
  <a href="a.htm">Get a ... by answering a questionnaire</a><br>
  </blockquote></td>
 <td valign="top">Many a little makes a litter<blockquote>
  <a href="a.htm">Dole available</a><br>
  <a href="a.htm">Broken Vacuum Bottle available</a><br>
  <a href="a.htm">Cursed VTR</a>
  </blockquote></td></tr>
</table>
</center></div>
</body></html>
```

FIG.3

```
< center >% 1 < center >
< form action ="http ://www.type.com/cgi – bin/type_serch.cgi ?
type =% 2" >
I % 3 < input type ="text" size ="25" maxlength ="200" name ="
keyword" value ="" >
< input type ="submit" value ="retrieve" >
</form >
```

FIG.4

```
< center > prize searching on your inconvenience < center >
< form action ="http ://www.type.com/cgi – bin/type_serch.cgi ?
type =% 2" >
I hope to get < input type ="text" size ="25" maxlength ="200" name
="keyword" value ="" >
< input type ="submit" value ="retrieve" >
</form >
```

FIG.5

The Great Devil of Presents

Home Page of Present Information by the Great Devil of Presents who is a friend of everyone Get Thousand Dollar Worth of Gorgeous Goods Buy a ... to go to a Round-The-World Trip
Win a new vihicle of ...

Many a little makes a mickle

What! Five Dollar Worth of Book Prepaid Cards for Five Hundred Persons
Beer Prepaid Card for Everyone who would buy 30 bottles of ... beer
On-Line Shopping of the ... Company
Get a ... by answering a questionnaire Get Thousand Dollar Worth of Gorgeous Goods ABC coffee is presenting 100th anniversary goods
Win ..., for a hundred persons
by registering with a free mail magazine
a questionnaire about internet service providers
Get ... Goods by answering a quiz Many a little makes a litter Dole available
Broken Vacuum Bottle available
Cursed VTR prize searching on your feeling of any inconvenience I hope to get [_____] [retrieve]

FIG.6

The Great Devil of Presents prize searching on your feeling of any inconvenience I hope to get [_____] [retrieval]

Home Page of Present Information by the Great Devil of Presents who is a friend of everyone

Get Thousand Dollar Worth of Gorgeous Goods

Buy a ... to go to a Round-The-World Trip
Win a new vihicle of ...

Many a little makes a mickle

What! Five Dollar Worth of Book Prepaid Cards for Five Hundred Persons
Beer Prepaid Card for Everyone who would buy 30 bottles of ... beer
On-Line Shopping of the ... Company
Get a ... by answering a questionnaire

Get Thousand Dollar Worth of Gorgeous Goods

ABC coffee is presenting 100th anniversary goods
Win ... for a hundred persons
by registering with a free mail magazine
a questionnaire about internet service providers
Get ... Goods by answering a quiz

Many a little makes a litter

Dole available
Broken Vacuum Bottle available
Cursed VTR

FIG.7

```
<!--type=present-->
<html><head><title>The Great Devil of Presents</title></head>
<bodybgcolor="#FFFFF">
<palign="center"><img src="present_devil.gif" width="500" height="100">
</p>
<palign="center">Home Page of Present Information by the Great Devil of
 Presents who is a friend of everyone</p>
<hr>
<div align="center"><center>
<table border="0" cellpadding="5"cellspacing="6"width="100%">
<tr>
 <td valign="top">Get Thousand Dollar Worth of Gorgeous Goods<
blockquote>
   <a href="http://a.b.c/a.htm">Buy a ... to go to a Round-The-World
Trip</a><br>
   <a href="http://d.e.f/d.htm">Win a new vihicle of ...</a>
   </blockquote></td>
 <td valign="top">Get Thousand Dollar Worth of Gorgeous Goods<
blockquote>
   <a href="http://g.h.i/g.htm">ABC coffee is presenting 100th
anniversary goods</a><br>
   <a href="http://j.k.l/j.htm">Win ..., for a hundred persons</a><br>
   <a href="http://m.n.o/m.htm">by registering with a free mail magagine
</a><br>
   <a href="http://p.q.r/p.htm">a questionnaire about internet service
providers</a><br>
   <a href="http://s.t.u/s.htm">Get ... Goods by answering a quiz</a>
   </blockquote></td></tr>
<tr>
 <td valign="top">Many a little makes a mickle<blockquote>
   <a href="a.htm">What! Five Dollar Worth of Book Prepaid Cards for
Five Hundred Persons</a><br>
   <a href="a.htm">Beer Prepaid Card for Everyone who would buy 30
bottles of ... beer</a><br>
   <a href="a.htm">On-Line Shopping of the ... Company</a><br>
   <a href="a.htm">Get a ... by answering a questionnaire</a><br>
   </blockquote></td>
 <td valign="top">Many a little makes a litter<blockquote>
   <a href="a.htm">Dole available</a><br>
   <a href="a.htm">Broken Vacuum Bottle available</a><br>
   <a href="a.htm">Cursed VTR</a>
   </blockquote></td></tr>
</table>
</center></div>
</body></html>
```

FIG.9

INFORMATION RETRIEVAL APPARATUS AND RECORDING MEDIUM HAVING AN INFORMATION RETRIEVAL PROGRAM RECORDED

CROSS REFERENCE TO RELATED APPLICATIONS

The present invention claims priority from Japanese Patent Application No. 11-198820 filed Jul. 13, 1999, the contents of which are incorporated herein by reference.

BACKGROUND OF THE INVENTION

1. Field of the Invention

The present invention relates to an information retrieval apparatus capable of retrieving a document being in accord with a user's intention of retrieval and a recording medium having an information retrieval program recorded in it.

2. Description of Related Art

In recent years, necessary information is often retrieved and utilized by using an information retrieval service on the World Wide Web (WWW). However, since an information retrieval service being generally performed on WWW requires an information retrieval request represented by a combination of keywords, a beginner being unfamiliar with a computer cannot properly represent a combination of keywords for exactly representing the desired information, and therefore has difficulty in exactly retrieving the desired information. As a conventional technique for performing an exact information retrieval by extracting a retriever's intention in consideration of such a problem, there is an information retrieval apparatus disclosed in Japanese Patent Laid-Open Publication No. Hei 7-105,233 (hereinafter referred to as literature 1). The information retrieval apparatus disclosed in literature 1 extracts a retriever's intention by means of interaction between the retriever and the apparatus using a natural language in order to perform an exact retrieval. The said information retrieval apparatus infers an inexplicit idiomatic expression or an abbreviated word being liable to be used in a natural language from the context of this interaction, and produces a retrieval request meeting the retriever's intention.

By the way, WWW has WWW pages each containing a collection of link destinations of a certain kind of information. A user can obtain a great amount of related information at a time by browsing these WWW pages, but since such pages are often made by gathering and arranging various formation by hand, it is difficult to cover all the related information. Therefore, in case of desiring further information, a user needs to move to a page for retrieval and perform retrieval in consideration of its retrieval conditions. It is conceivable also to make a page for retrieval using the information retrieval apparatus disclosed in literature 1, but in such a case even if an inexplicit idiomatic expression or an abbreviated word is allowable, eventually a retriever results in being forced to input a natural language and in bearing a burden equivalent to or heavier than inputting keywords. And it is necessary to analyze in advance a document straightforwardly representing the content of a document to be retrieved and additionally it is necessary to prepare a concept dictionary at the information retrieval apparatus side, and therefore construction of such an apparatus requires such a great cost that it is not practical.

SUMMARY OF THE INVENTION

In consideration of the above-mentioned problems of the prior art, an object of the present invention is to provide an information retrieval apparatus capable of performing a retrieval of exact related information by a necessary minimum input in case of desiring further related information during browsing some retrieval objects such as WWW pages.

According to the present invention, an information retrieval apparatus is provided with a data monitoring and content judging means for monitoring a sentence retrieved from a database and inferring a field which the said sentence belongs to, and retrieval screen generating means for generating a retrieval screen for allowing a user to perform a retrieval operation taking the inferred field as an object of retrieval and outputting the retrieval screen as data to be displayed together with said retrieved sentence.

BRIEF DESCRIPTION OF THE DRAWINGS

Specific embodiments of the present invention will now be described, by way of examples only, with reference to the accompanying drawings in which:

FIG. 2 shows an example of a WWW document, FIG. 3 shows an example of text data of a WWW document, FIG. 4 shows an example of a template, FIG. 5 shows another example of a template, FIG. 6 shows an example of a WWW document by the template shown in FIG. 4, FIG. 7 shows an example of a WWW document by the template shown in FIG. 5, FIG. 9 shows an example of text data of a WWW document.

DETAILED DESCRIPTION OF THE PREFERRED EMBODIMENTS

Figure 1:
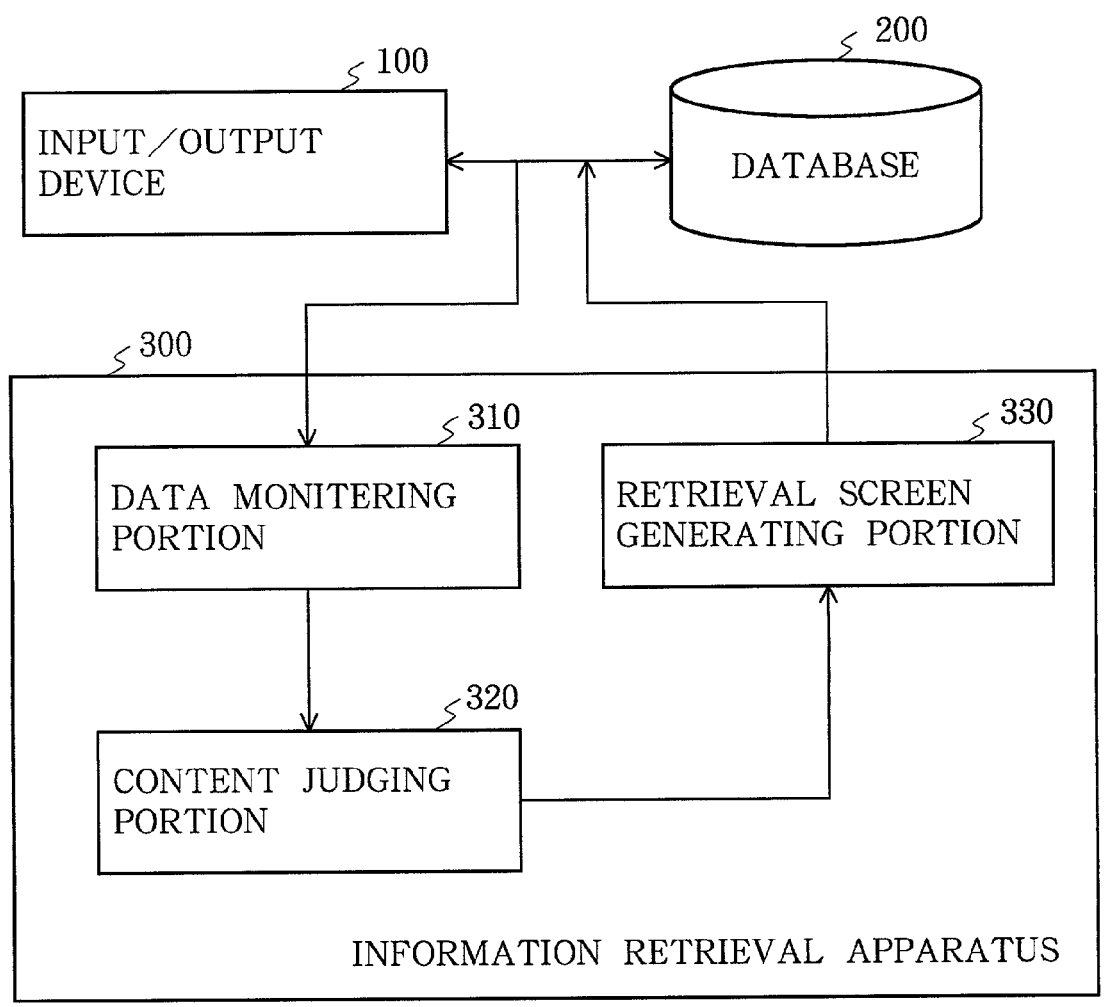
FIG. 1 is a block diagram showing the composition of a first embodiment of the present invention.
Figure 8:
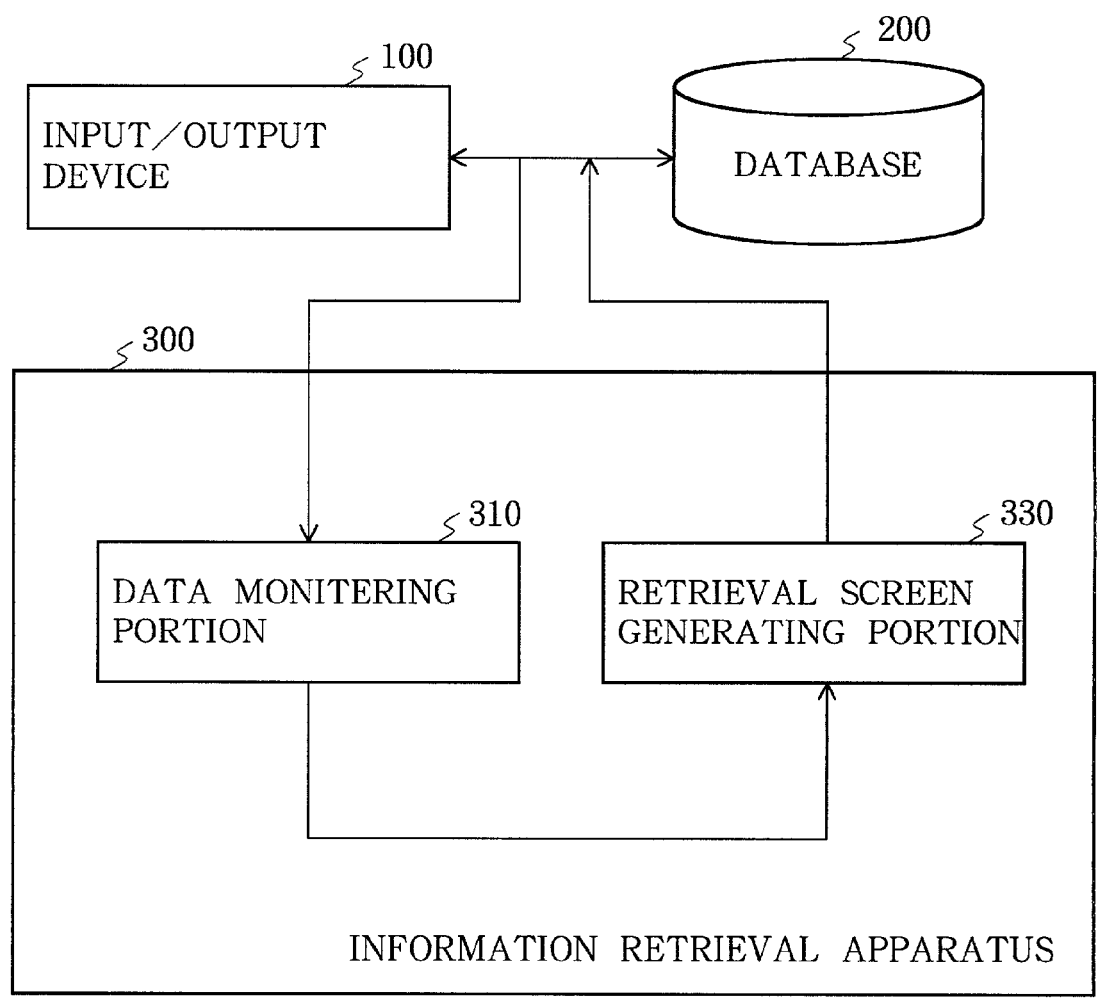
FIG. 8 is a block diagram showing the composition of a second embodiment of the present invention.

Referring to FIG. 1, this embodiment apparatus comprises an input/output device 100 capable of inputting a retrieval condition and the like and displaying a result of retrieval, a database 200 containing a sentence document to be an object of retrieval, and an information retrieval apparatus 300 for providing an exact retrieval function meeting a retriever's intention. The database 200 may be a physically single database or may be a database being physically distributed but logically single. In FIG. 1, there is only one database 200 for convenience, but there may be a plurality of databases respectively distributed to plural sites on a network or the like. The information retrieval apparatus 300 is provided with a data monitoring portion 310 for monitoring data sent by the database 200 to the input/output device 100, said data being data of a document to be an object of retrieval requested by a user using the input/output device 100, a content judging portion 320 for identifying the kind of a content by referring to the content of the data and determining whether or not a retrieval screen is to be generated, and a retrieval screen generating portion 330 for generating a retrieval screen adaptive to the content.

Operation of this embodiment is described in detail. A user requests a document to be an object of retrieval from the database 200, using the input/output device 100. The database 200 communicates a document to be an object of retrieval requested by the user to the input/output device 100 through a network communication and the like. The data monitoring portion 310 of the information retrieval apparatus 300 monitors communication of the document to be an object of retrieval from this database 200 to the input/output device, obtains this document, and notifies the content judging portion 320 of this fact. The content judging portion 320 analyzes the content of this document and judges whether or not there is the possibility that the user requests retrieval. In case that the content judging portion 320 has judged that there is the possibility that the user requests a retrieval, the retrieval screen generating portion 330 sends data for retrieval to the input/output device 100. A retrieval screen generated by the retrieval screen-generating device 100. A retrieval screen generated by the retrieval screen-generating portion 330 has a function for performing retrieval on the database 200.

In this embodiment, since a retrieval screen capable of retrieving a document related to a document to be an object of retrieval spontaneously requested by a user is generated and provided to the user, the user does not need to search another document to be an object of retrieval or input detailed retrieval conditions for the retrieval. Thanks to this, it is possible to reduce a burden of retrieval on the user to a necessary minimum.

This embodiment is described using a concrete example. In this example it is assumed that such WWW documents as HyperText Markup Language (HTML) documents, eXtensible Markup Language (XML) documents and the like are kept in a database 200, and a user browses the said WWW documents through a browser on an input/output device.

Various HTML documents on the Internet are stored in the database 200. The form of storage in the database may be either a database form or a file form of a file system. Similarly to a conventional WWW technique, the database 200 does not need to be a single database but may be a plurality of databases respectively existing at different sites. And it may contain not only HTML documents but also structured documents such as XML documents, and other text documents. The database 200 holds these WWW documents. Through a browser operating on the input/output device 100, a user can browse these WWW documents, and browse different documents one after another by referring to links contained in these documents.

The browser on the input/output device 100 communicates with the database 200 through a network, and sends and receives a WWW document. A WWW document to be sent may be a reference of WWW documents of the database 200 or a retrieval request to the server of the database 200. A WWW document to be received is a WWW document itself of the database 200. However, it may be a WWW document originally existing in the database 200 or a WWW document dynamically produced by the server of the database 200.

FIG. 2 shows an example of a WWW document requested by a user. This example is a display example by a browser, and data actually sent from the database 200 to the browser are text data as shown in FIG. 3. And FIG. 2 does not describe an interface portion standardly attached to a browser. The WWW document of FIG. 2 is a document describing present information, and a WWW document containing the content of an underlined part can be displayed by pressing the underlined hyperlink portion on the browser by means of an input device such as a mouse or the like.

Since this point is the same as a conventional WWW technique, a person in this field can naturally understand this point.

Text data (FIG. 3) of a WWW document sent from the database 200 to the browser are monitored by the data monitoring portion 310. The information retrieval apparatus 300 is not limited to implementation by hardware but a browser having an information retrieval apparatus 300 embedded in it may monitor text data or a proxy server for relaying text data of a WWW document, said proxy server having an information retrieval apparatus 300 embedded in it, may monitor text data.

And data directed to a browser (actually a computer equipped with a browser) may be monitored by incorporating an information retrieval apparatus 300 into the software for monitoring text data of a WWW document.

When the data monitoring portion 310 knows that text data of a WWW document directed to a browser have been sent, the data monitoring portion 310 monitors and sends these data to the content judging portion 320. The content judging portion 320 infers from these data a field, which this WWW document belongs to. For example it infers that the WWW document of FIG. 3 belongs to a field of "present information". Objective fields to be inferred by the content judging portion 320 are limited in advance. For example, they may include "present information", "event information", "commodity catalog information", "paper invitation information" and the like. These objective fields are similar to a type described in literature 2 ("Type Classification and Retrieval Using an Internet Multilateral Retrieval System OTROS-Structural Features", Information Processing Society of Japan, 57th National Convention Proceedings (3), pp. 145–146, 1998). Inference of a field can be performed on the basis of a character string in text data of a WWW document and the number of links. Namely, whether or not it is "present information" is inferred on the basis of whether or not a character string of "present" is contained in the data and the number of links is equal to or greater than a fixed value (10 for example). Since an example of text data of a WWW document shown in FIG. 3 contains a character string of "present" and the number of links (part surrounded by tags <a> and </a>) is 14, the content judging portion 320 judges that that document is "present information". A WWW document in these objective fields is a document which presents a collection of information in its field to a user and which is browsed first by the user desiring to know information of this field (said document being called a portal site). In case that a document does not belong to any of the fields limited in advance, the content judging portion 320 judges that the document is not a portal site and discards it.

In case of judging that a WWW document belongs to either of the objective fields, the content judging portion 320 notifies the retrieval screen-generating portion 330 of that field. For example, in case of text data of the WWW document of FIG. 3, the content judging portion 320 notifies the retrieval screen-generating portion 330 that this document is "present information". And when the content judging portion 320 cannot judge what objective field a WWW document belongs to, it ends hereupon the process of the information retrieval apparatus 300.

The retrieval screen-generating portion 330 generates a screen for retrieval using a template prepared in advance (FIG. 4). Items %1 sand %3 vary depending upon objective fields, and for example in case of "present information", they are displayed as shown in FIG. 5. Here it is assumed that a server of WWW for providing type retrieval described in literature 2 exists in a URL (Uniform Resource Locator)

of "http://www.type.com/cgibin/type-search.cgi". The retrieval screen generating portion 330 embeds text data generated like FIG. 5 into data sent from the database 200 to a browser 150, namely, text data of a WWW document which is monitored by the data monitoring portion 310 and is judged as "present information" by the content judging portion 320. The data having a template embedded is sent to the browser in the same way as data sent to the browser by the database 200.

FIG. 7 shows an example of information displayed on the browser by the retrieval screen-generating portion 330 on the basis of the information sent to the browser. A screen to be originally displayed like FIG. 2 by the browser is modified like FIG. 6 by the information retrieval apparatus 300. Here a method in which the retrieval screen-generating portion 330 embeds a template into an original document is shown, but there is also a method of sending only a template to the browser as separate data without embedding the template.

FIG. 7 shows a case where a template is not embedded but sent as separate data.

In case that an original document is insufficient in information, a user who has received such a retrieval screen can retrieve information similar to this document by only inputting its objective keywords in the retrieval screen.

A second embodiment of the present invention is described with reference to FIG. 9. In this embodiment, information of objective fields described in advance by a database maker or the like is stored in a database 200, the content judging portion 320 in the first embodiment is omitted from an information retrieval apparatus 300.

In this embodiment, a data monitoring portion 310 of the information retrieval apparatus 300 monitors communication of a WWW document from the database 200 to a browser. The data-monitoring portion 310 takes the WWW document and notifies a retrieval screen-generating portion 330 of it. The retrieval screen-generating portion 330 takes the objective field information contained in this document and sends data for retrieval to the browser. A retrieval screen generated by the retrieval screen-generating portion 330 contains a means for performing an information retrieval on the database 200.

Since this embodiment generates and provides to a user a retrieval screen related to an applicable on the basis of objective field information determined by a producer itself of documents stored in the data base 200, it is not necessary for the user to search a retrievable see document related to the applicable document or to input retrieval conditions in detail. This makes it possible to perform an exact retrieval while reducing a user's burden to a necessary minimum.

Next, operation of the second embodiment is described using a concrete example. Here, only points different from the first embodiment are described.

In this embodiment also, it is assumed that a WWW document as shown in FIG. 2 is sent from the database 200 to the browser in response to a user's request. FIG. 9 shows actual text data of the WWW document of FIG. 2. It is different from data of FIG. 3 of the first embodiment in that there is a comment line on the first line. In an HTML document, a portion which starts at <!-- and ends at --> is a comment portion and is not displayed on a browser. Other WWW documents also have the same comment function as this.

The data-monitoring portion 310 monitors text data to be sent from the database 200 to the browser 150. In case that there is a WWW document directed to the browser and a comment to indicate its objective field exists at the forefront of the text data, the data monitoring portion 310 does not send this data to the browser but sends it to the retrieval screen generating portion 330. A comment to indicate an objective field is a comment explicitly indicating that an objective field is "present information" by "type=present" like the forefront comment line (<!--type=present-->) of FIG. 9. The data-monitoring portion 310 finds such a comment line. Such a method of indicating the objective field of a comment line is an example and is sufficient to have any form capable of being identified by a computer, and does not limit its form.

The data monitoring portion 310 sends an objective field extracted to the retrieval screen-generating portion 330. Like the first embodiment, the retrieval screen-generating portion 330 generates a retrieval screen using a template prepared in advance.

An information retrieval apparatus of the present invention can be realized by means of a computer by producing a computer program implementing the respective functions of the data monitoring portion 310, the content judging portion 320 and the retrieval screen generating portion 330 contained in the information retrieval apparatus 300, storing this computer program in a recording medium represented by a CD-ROM, a floppy disk or a semiconductor memory, and generating said respective functions on the computer by reading out this program from the recording medium having this program stored in it at the computer side. And this computer program may be an embodiment stored in storage inside a server, and may be an embodiment providing the program stored in this server through a network.

As described above, according to the present invention, it is possible to retrieve the same information as information currently browsed by a user, for example, information contained in a WWW document by inputting only keywords. The reason is that the present invention provides a retrieval function which automatically judges an objective field of a WWW document being currently browsed, automatically gives a retrieval screen limiting the objective field, and requires a user to input only keywords.

What is claimed is:

1. An information retrieval apparatus comprising:
a data monitoring and content judging means for monitoring a document retrieved from a database and inferring a field to which this document belongs, and
a retrieval screen generating means for generating a retrieval screen for a user to perform a retrieval operation taking the inferred field as an object of retrieval and outputting the retrieval screen as data to be displayed together with said retrieved document, wherein
a document retrieved from said database is a structured document, and
said retrieval screen is a screen of a structured document in which screen a retrieval part is embedded in the retrieved structured document and a user can retrieve.

2. An information retrieval apparatus comprising:
a data monitoring and content judging means for monitoring a document retrieved from a database in inferring a field to which this document belongs, and
a retrieval screen generating means for generating a retrieval screen for a user to perform a retrieval operation taking the inferred field as an object of retrieval and outputting the retrieval screen as data to be displayed together with said retrieved document, wherein
a document retrieved from said database is a structured document, and said retrieval screen is a screen of a structured document in which a retrieval part is separate from the retrieved structured document and a user can retrieve.

3. An information retrieval apparatus according to claim 1, wherein;
output of said retrieval screen generating means is supplied to an input/output means for retrieving and displaying a document stored in said database, and
said input/output means displays a retrieval screen outputted by said retrieval screen generating means and retrieves again another document stored in said database by a retrieval operation performed by a user according to this retrieval screen.

4. An information retrieval apparatus comprising:
a data monitoring and content judging means for monitoring a document retrieved from a database and inferring a field to which this document belongs, and
a retrieval screen generating means for generating a retrieval screen for a user to perform a retrieval operation taking the inferred field as an object of retrieval and outputting the retrieval screen as data to be displayed together with said retrieved document, wherein
a document retrieved from said database is a structured document, and
said data monitoring and content judging means infers a field which the structured document belongs to, using as a criterion of judgement either one or both of the content of text data contained in the structured document and the number of links.

5. An information retrieval apparatus comprising:
a data monitoring and content judging means for monitoring a document retrieved from a database and inferring a field to which this document belongs, and
a retrieval screen generating means for generating a retrieval screen for a user to perform a retrieval operation taking the inferred field as an object of retrieval and outputting the retrieval screen as data to be displayed together with said retrieved document, wherein
a document retrieved from said database is given in advance the information for identifying its field, and
said data monitoring and content judging means notifies said retrieval screen generating means of a field represented by said identifying information.

6. A recording medium having an information retrieval program stored in a recording medium, said program making a computer realize a data monitoring and content judging function for monitoring the content of a document retrieved by an input/output device capable of retrieving a document stored in a database and for inferring a field which to said document belongs, and a retrieval screen generating function for generating a retrieval function taking the inferred field as an object of retrieval and providing the retrieval function generated to said input/output device.

7. An information retrieval apparatus according to claim 2, wherein
output of said retrieval screen generating means is supplied to an input/output means for retrieving and displaying a document stored in said database, and
said input/output means displays a retrieval screen outputted by said retrieval screen generating means and retrieves again another document stored in said database by a retrieval operation performed by a user according to this retrieval screen.

* * * * *